United States Patent [19]

Nelson et al.

[11] Patent Number: 5,452,447
[45] Date of Patent: Sep. 19, 1995

[54] METHOD AND APPARATUS FOR A CACHING FILE SERVER

[75] Inventors: Michael N. Nelson, San Carlos; Yousef A. Khalidi, Sunnyvale, both of Calif.

[73] Assignee: Sun Microsystems, Inc., Mountain View, Calif.

[21] Appl. No.: 995,423

[22] Filed: Dec. 21, 1992

[51] Int. Cl.6 .............................................. G06F 12/08
[52] U.S. Cl. ................................... 395/650; 395/600; 395/403; 395/404; 395/440; 395/200.09; 395/200.16; 364/246.3; 364/256.3; 364/DIG. 1
[58] Field of Search ................ 395/600, 650, 700, 425

[56] References Cited

U.S. PATENT DOCUMENTS

| | | | |
|---|---|---|---|
| 5,113,519 | 5/1992 | Johnson et al. | 395/600 |
| 5,175,852 | 12/1992 | Johnson et al. | 395/600 |
| 5,263,157 | 11/1993 | Janis | 395/600 |
| 5,321,841 | 6/1994 | East et al. | 395/725 |

OTHER PUBLICATIONS

Lea et al., "The Impact of Distribution on Support for Object-Oriented Software Developement," Software Engineering Journal, Mar. 1992, pp. 130–138.
"A Distributed Consistency Server for the CHORUS System" by Vadim Abrosimov et al., Usenix Association, pp. 129–148.
"Caching in the Sprite Network File System" by Michael N. Nelson et al., ACM Transactions . . . , v.6, n.1, Feb. 1988, pp. 134–154.
"Exporting a User Interface to Memory Management from a Communication-Oriented Operating System" by Michael W. Young, 1990, pp. 57–96.

Primary Examiner—Thomas G. Black
Assistant Examiner—Larry J. Ellcessor
Attorney, Agent, or Firm—Erwin J. Basinski

[57] ABSTRACT

A method and apparatus are described for a caching file server ("CFS") system which permits end user client programs on a local node of a distributed computer system, to issue requests to read/write data to a remote file and to query/set attributes of the remote file, and to have these requests serviced by the CFS in a way which minimizes the caching resources used as well as minimizes the related network communications. The CFS establishes CFS file programs to interface with the client programs, and sets up a common CFS cache for the file attributes, which cache is kept current via a communications link to a file program in a file server at the remote node containing the file, wherein the file program automatically updates the common CFS cache whenever any attributes change. The CFS also caches the results of bind operations in order to further minimize network calls and redundant cache usage. In addition the CFS coordinates all client program requests for read/write data requests with a virtual memory manager ("VMM") on the local node, servicing all client programs from a single pager program in the VMM which is coupled to a cache program in the file server of the remote node. VMM page-in/page-out operations go directly to the remote file server without CFS intervention. In this manner, network communications and related processing overhead as well as memory resources may be minimized by use of the VMM for caching file data and the Common CFS cache for caching file attributes.

28 Claims, 6 Drawing Sheets

PRIOR ART

PRIOR ART

MAJOR SPRING SYSTEM COMPONENTS

METHOD AND APPARATUS FOR A CACHING FILE SERVER

BACKGROUND OF THE INVENTION

1. Field of the Invention

This invention relates in general to the fields of Computer Operating Systems, Multi-processor Hardware Systems, Object Oriented Programming, and Virtual Memory Systems. In particular, the invention relates to improved techniques for establishing and efficiently handling relationships between a client program, a file system server and a virtual memory manager ("VMM").

2. Background

Object oriented operating systems, with microkernels which permit client level implementation of file systems, create complexities in memory management which clients have not had to deal with in the past. Moreover, on widely distributed computer networks, having files resident on different computers, clients are not prepared to handle the fact that file accesses may produce unnecessary network communications traffic.

This disclosure describes some of these inefficiencies that exist in the prior art and provides a method and apparatus for significantly reducing them.

The role of the operating system in a computer has traditionally been to efficiently manage the hardware resources (the central processing unit ("CPU"), memory and input/output devices). This management function has included the role of managing the file system, which comprises data and programs stored generally on a disk drive or magnetic tape system. In modern systems, this management function has included the use of a virtual memory subsystem. More specifically, the operating system has traditionally been responsible for: creating and deleting files and directories; providing support for primitive program routines for manipulating files and directories; mapping files onto disk storage; and general protection of the files by limiting access of programs, processes and users to the files.

Distributed computer systems, some with shared memory, and some with remotely accessible file systems, have led to the creation of "distributed file systems ("DFS")" to support the sharing of files by multiple users when the files are physically dispersed among the various computers of a distributed system. A DFS is a file system whose clients, servers and storage devices are dispersed among the machines of a distributed system. The location and multiplicity of the servers and storage devices is transparent to the client.

In a DFS the time to satisfy a client's request is a function of: disk access time and a small amount of associated CPU time; the time needed to deliver the request to a server; the time for getting the response back across the network to the client; the actual data transfer time; and the related CPU overhead for running the communications protocol software. Access times for DFSs have been shortened by the use of caching techniques on local machines to minimize the overall remote file accessing times. Nevertheless, minimization of the access times for retrieval of data from remote files remains a major goal of computer hardware and software designers. For additional information on operating systems, file systems and related problems, see the text "Operating System Concepts" 3rd edition, by A. Silberschatz, J. Peterson and P. Glavin, 1991 Addison-Wesley Publishing Inc.

With the advent of microkernel operating systems, file systems are being implemented outside of the kernel in user level servers. These new file systems must solve a new set of problems to provide efficient performance. For example, the following describes a number of areas where caching of file data and file attributes would provide significant efficiency improvements in either memory usage or in network accesses in such user level file system implementations.

The MACH operating system developed by Carnegie Mellon University, is an object oriented operating system, with a minimum sized extensible kernel, based upon communications facilities. All requests to the kernel, and all data movement among processes are handled through one communications mechanism. In MACH, many traditionally kernel-based functions, such as file services, can be implemented as user-level servers. Other modern operating systems like MACH are being developed.

MACH presently implements virtual memory techniques in an object oriented system. In MACH, the use of a memory object to both encapsulate the mapping and attributes of a memory space and to control the communications to a memory cache object and the related paging operations can result in an inefficient use of the physical memory space used by the cache as well as related unnecessary paging operations where two or more programs or tasks or processes or threads (hereinafter "programs") with each having access rights, are using the same memory space. These inefficiencies result from the fact that MACH creates a separate related memory cache object each time a new memory object with different access rights is mapped, without regard for the possibility that the same data is already being paged by another memory object-memory cache object pair. For example, if a client wishes to access a file, the client sets up a file system object and memory maps it, MACH creates a memory object and related cache and communications port to accept messages for the memory object to get data from and write data to the file. If a second client with a different access mode, wishes to access the same file, MACH sets up a second memory object, related data cache and communications port. This is obviously a redundant and inefficient use of scarce memory resources as well as a duplication of the system overhead when the file is located on a remote machine. For more detailed information on MACH, see "Exporting a User Interface to Memory Management from a Communications-Oriented Operating System" by Michael Wayne Young, Doctoral Thesis for Carnegie Mellon University, November 1989, CMU-CS-89-202.

In the prior art, an additional problem exists with file objects besides the fact that a duplicate MACH memory object with a duplicate cache is set up if a second user with a different access mode, memory-maps the same file object. This is the problem created by the fact that all requests on the file object go the same location; that is, to the location containing the implementor of the file object. Going to the same location for all requests is inefficient when the file data resides on a remote host. This is especially true when two client programs wish to access the same file and at least one of them wishes to access the file attributes. For example, there are two possible ways to approach this problem but each has its performance problems:

Case 1) Implementor of the file is on a remote machine. Referring to FIG. 1, a first client 12 and a second client 14 are on local node 10 as is a VMM 16. Remote node 24 contains a file server 26 with a file object 28 and a connected file storage system 25. The first client 12 has mapped the file object 28 using the VMM 16 to access file data through the memory object port 18 to cache object 30 connection. The second client 14 wishes to access the same file but wants to "query/set attributes". Since the VMM 16 cannot cache this data, the second client 14 must access the remote file object 28 directly without the benefit of caching. In this case all requests to the file are remote. Whereas this may not be a problem for page-in/page-out requests from the VMM 16 for the first client 12 (because the VMM can cache the data locally), all read/write requests as well as attribute query/set requests by the second client 14 must also go to the remote implementor of the file with no possibility of caching the data or attributes. Note that the file data requested by the second client's direct request may even be already located in the cache controlled by the local VMM 16 but there is no way to know this or to share this information.

Obviously it would be more efficient if both clients could access a common cache locally, both in terms of memory usage and in reduced network accesses. Moreover, if the attributes could also be cached locally, even more network accesses would be saved.

Case 2) Implementor of the file is on the local machine, but the data is on a remote machine. Referring now to FIG. 2, again local node 10 contains the first client 12, and the second client 14, and the VMM 16. But in this case the local node also contains a file server 40 which contains the file object 44 for file 46 located on the remote node 24. The first client 12 invokes its data read/write requests to the file object 44 on the same node 10. The second client 14 invokes commands on the file object 44 as well. The file object 44, the implementor of the file, has the ability to cache file data and attributes so it could satisfy any requests from its local cache. However, all page-in/page-out operations by the VMM 16 bear an added cost of going indirectly through the local implementor (the file object 44) to the remote node 24 that holds the data, instead of going directly to the remote node 24 for the data.

Access time could be saved if the VMM could access the remote file directly, and could cache the data and attributes for all local clients that wanted access to the file.

Other kinds of file operations that would benefit from caching include:

Mapping. Each time that a client domain maps a file into its address space, a bind call must go to the file server. If the file is remote, this requires a network access on each map call. If the result of binds could be cached locally, then many of these network accesses could be eliminated.

Getting file attributes. If the file is remote, several opportunities for saving network accesses are available by caching the file length. In addition, all of a file's attributes are returned via the stat call. In current UNIX ® system, stat calls are very frequent. This is yet another area where caching can be effective. (UNIX is a registered trademark of UNIX Systems Laboratories Inc.).

Obviously if the implementor, client file server and the file system are all on the same machine, there is no network overhead involved, although the inefficiencies of possibly duplicated data storage remains. However, cases 1 and 2 are the more common in a DFS. These problems create unnecessary network traffic and redundant use of memory for multiple caching of the same data.

SUMMARY OF THE INVENTION

The present invention provides a method and apparatus for solving these problems. Network communications overhead is reduced and redundant data caching for files is eliminated. This is done by establishing a Caching File Server ("CFS") on the same machine as the end user client that wants to access the file. The CFS becomes the implementor of the file object and establishes a cache for the file attributes as well as a private communications channel to the remote file server to retrieve or set attributes whenever required. The CFS also establishes a memory mapping for the file data which makes use of the VMM on that machine and its caching abilities for the data. The VMM establishes its own memory object link to a pager object on the remote node containing the file server for doing its page-in/page-out operations. This is done by restructuring the file object into a CFS file object and a cache_object-pager_object pair, and implementing the CFS file object locally in such a way that all file data and attributes are cached locally. This also improves the efficiency of paged data space usage and correspondingly reduces the processing time needed to support paged data operations by allowing the VMM and end user clients to share the same pages of data via different CFS file objects, even though each CFS file object may have different access rights to the data. Thus the present invention elegantly minimizes the overall network overhead for file operations in a DFS by allowing some operations to go remote (the normal VMM controlled page-in/page-outs) and some operations to go local (the get attributes and bind operations).

According to the invention, this is accomplished by establishing in a local computer node a caching file server ("CFS") which provides caching services for remote files, and by creating in this CFS a CFS file program which can recognize requests from a local client to read/write data to a remote file and can coordinate the caching of the remote file data with a virtual memory manager ("VMM") in the local computer, and which can recognize requests to query/set attributes of the remote file and can cache these file attributes in the CFS, whereby the caching services provided by the CFS and the VMM for the remote file are not duplicated and related network communications traffic between the local and remote computers is minimized. In addition the CFS has the ability to accommodate a second local client which wishes to access the same remote file, providing a CFS file program to service this second client which can share the read/write data cache in the VMM and share the file attribute data in a common CFS cache, so that again there is no redundant data caching and network traffic is minimized. Moreover, the CFS has the ability to cache the result of "bind" operations which establish the VMM-Pager linkage, in order to further reduce network accesses when a subsequent request for an already established linkage appears. The invention also provides mechanisms for maintaining coherent data in the file attribute cache while minimizing the related network traffic.

DESCRIPTION OF THE DRAWINGS

The objects, features and advantages of the system of the present invention will be apparent from the following description in which.

NOTATIONS AND NOMENCLATURE

Figure 1:
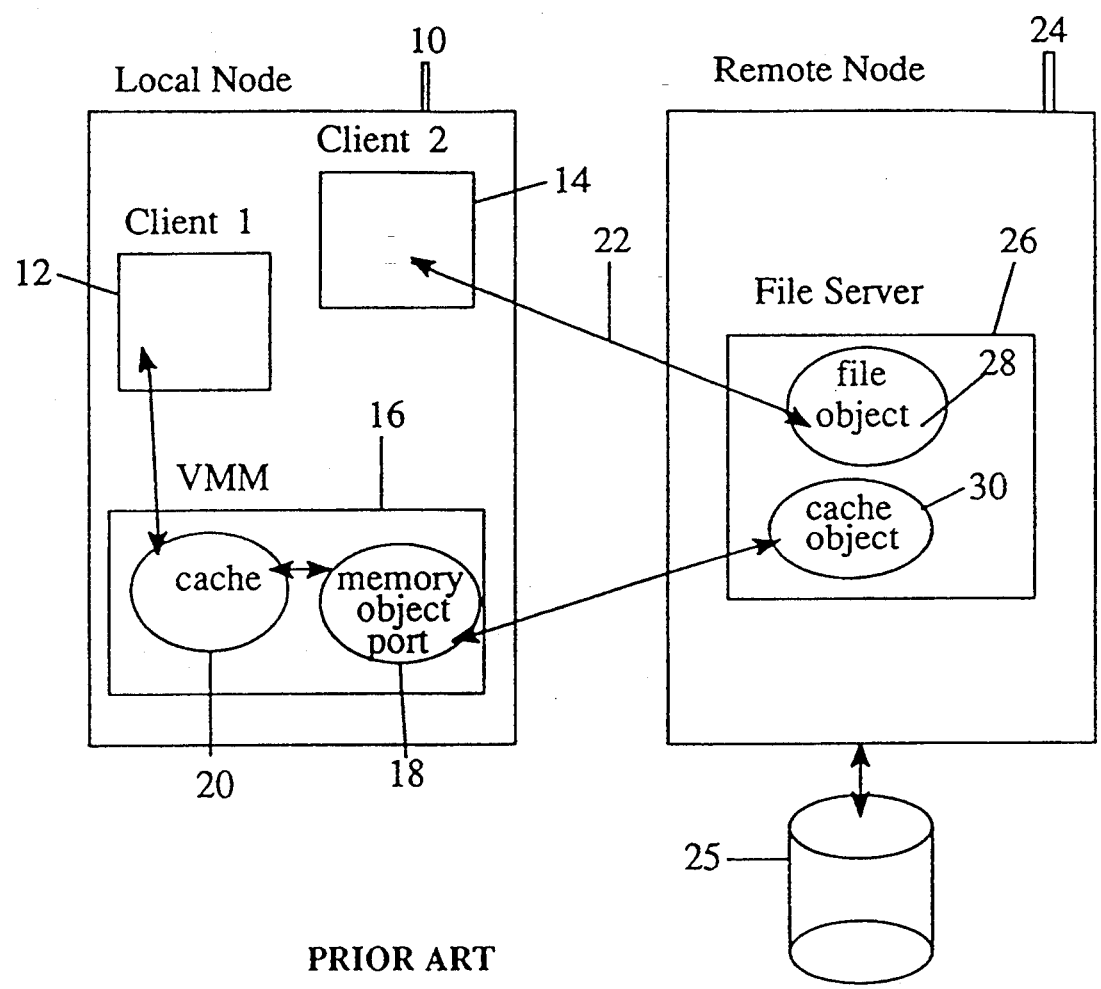
FIG. 1 illustrates a Case 1 prior art caching configuration.
Figure 2:
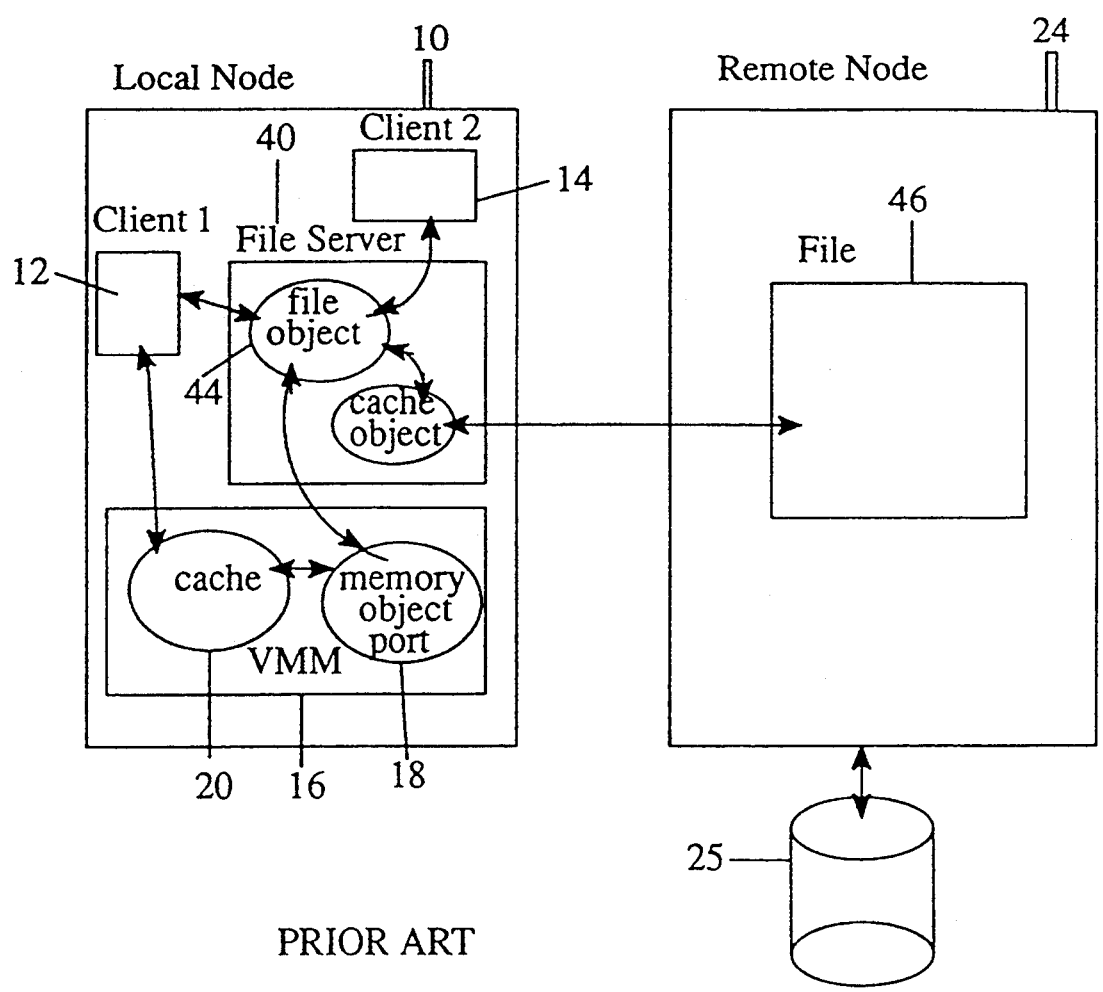
FIG. 2 illustrates a Case 2 prior art caching configuration.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Description of the Preferred Embodiment

The following disclosure describes solutions to the problems which are encountered by client programs which reference file systems in an extensible microkernel operating system. A method and an apparatus are disclosed for a Caching File Server ("CFS"), which allow client programs to have the ability to access file systems in a distributed computer system, using caching techniques, and using virtual memory management techniques in an efficient way and in a trusted environment, which is especially adapted for systems using object oriented programs. In the following description, for purposes of explanation, specific data and configurations are set forth in order to provide a thorough understanding of the present invention. The preferred embodiment described herein is implemented as a portion of the SPRING Object-Oriented Operating System created by Sun Microsystems ®, Inc. (Sun Microsystems is a registered trademark of Sun Microsystems, Inc.). However, it will be apparent to one skilled in the art that the present invention may be practiced without the specific details and may be implemented in various computer systems and in various configurations, or makes or models of tightly-coupled processors or in various configurations of loosely-coupled multiprocessor systems.

The SPRING Operating System

The present invention is currently embodied in the Sun Microsystems, Inc. SPRING operating system ("SPRING"), a distributed operating system designed around a microkernel architecture, and a cache-coherent, network virtual memory system. SPRING has no user-visible kernel calls. The interfaces for services traditionally implemented as kernel calls are specified in an object-oriented interface definition language that supports multiple inheritance, similar to IDL as defined by the Object Management Group (OMG). A client application program can request the creation of an object, invoke methods from the interface of an object, and pass an object as a parameter to other invocations, without regard to the location of the object's implementation. Invocations of methods on an object are made via client-side stubs that perform remote procedure calls, if necessary to the server-side implementation. The stubs are compiled independently of any application and can be dynamically linked to any client that needs them. Accordingly, in this environment, a file system may be physically located on any one of a number of distributed machines and a given client program would have no prior knowledge of the location of the file or efficient ways to perform data reads/writes or to query/set attributes.

A SPRING object is an abstraction that contains state and provides a set of methods to manipulate that state. The description of the object and its methods is an interface that is specified in the interface definition language. The interface is a strongly-typed contract between the implementor (server) and the client of the object.

A SPRING domain is an address space with a collection of threads. A given domain may act as the server of some objects and the clients of other objects. The implementor and the client can be in the same domain or in a different domain.

Since SPRING is object-oriented it supports the notion of interface inheritance. Spring supports both notions of single and multiple interface inheritance. An interface that accepts an object of type "foo" will also accept an instance of a subclass of "foo". For example, the address_space object has a method that takes a memory_object and maps it in the address space. The same method will also accept file and frame_buffer objects as long as they inherit from the memory_object interface.

The SPRING kernel supports basic cross domain invocations and threads, low-level machine-dependent handling, as well as basic virtual memory support for memory mapping and physical memory management. A SPRING kernel does not know about other SPRING kernels—all remote invocations are handled by a networkproxy server. In addition, the virtual memory system depends on external pagers to handle storage and network coherency.

Figure 3:
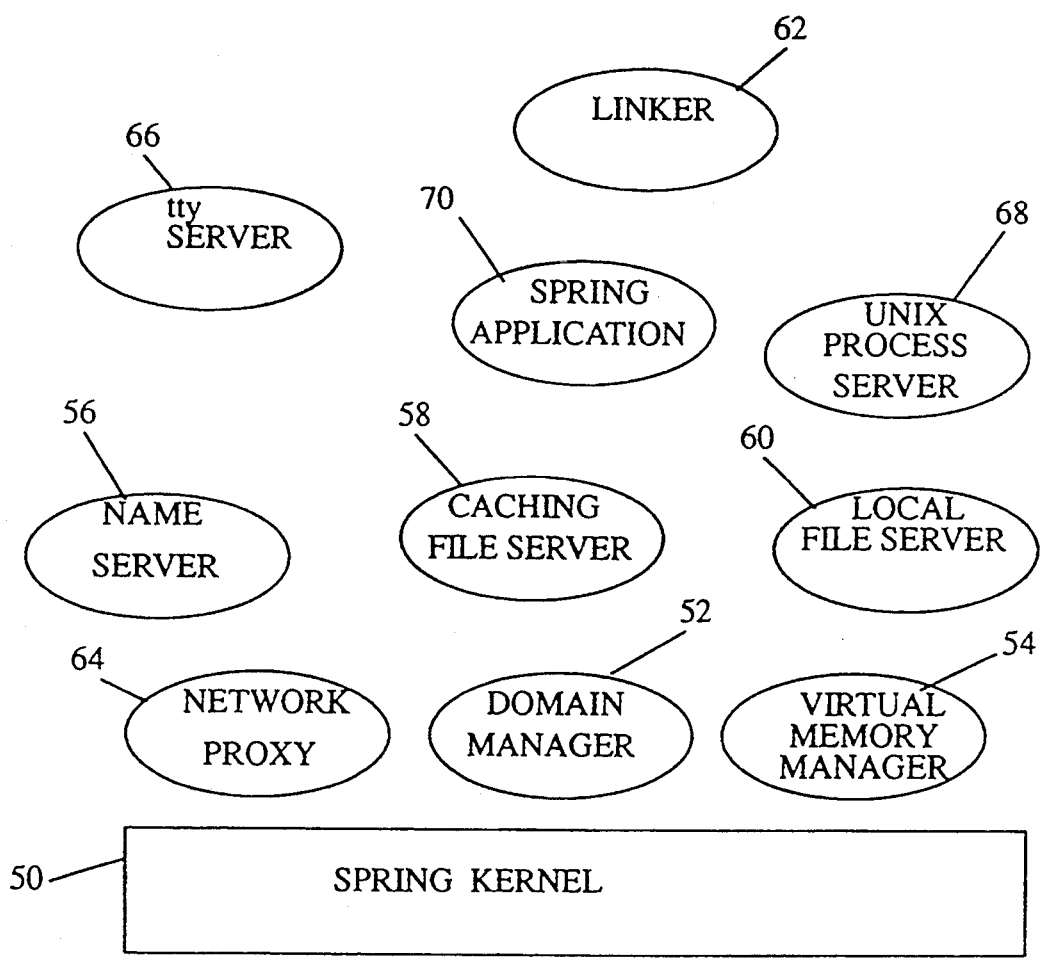
FIG. 3 illustrates the major system components on a SPRING Operating System node.

Referring to FIG. 3, a typical SPRING node runs several servers in addition to the kernel 50. These include the domain manager 52; the virtual memory manager ("VMM") 54; a name server 56; the CFS file server 58 described in this disclosure; a local file server 60; a linker domain 62 that is responsible for managing and caching dynamically linked libraries; a network proxy 64 that handles remote invocations; and a tty server 66 that provides basic terminal handling as well as frame-buffer and mouse support. Other major SPRING system components which might be present are a UNIX process server 68 and any number of SPRING applications 70.

THE CACHING FILE SERVER ("CFS")

The CFS is a per-machine caching file server that uses the virtual memory system to provide caching of data for read and write operations on files, and that has its own private protocol with the remote file servers to cache file attributes. When the CFS starts up on a machine it registers itself with the naming server on that machine.

Figure 4:
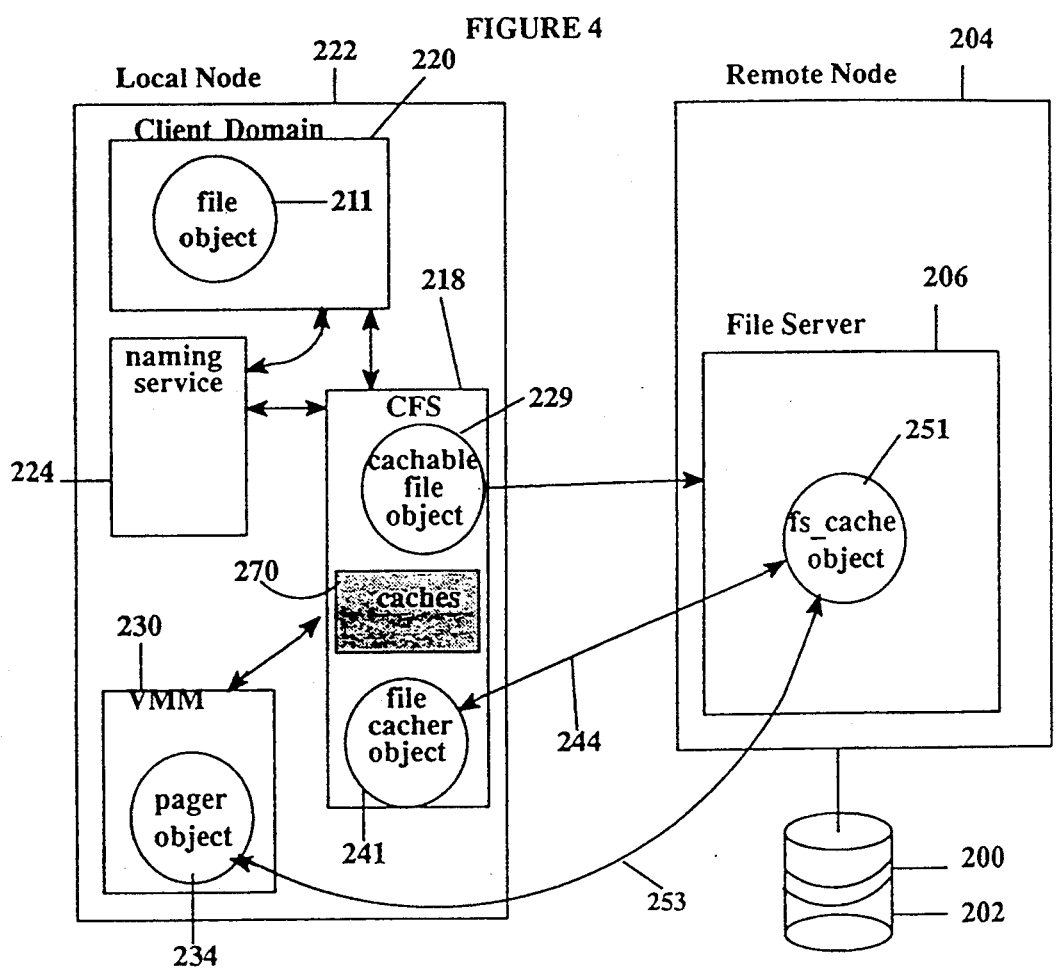
FIG. 4 illustrates the general relationship of the Caching File Server ("CFS") to other major system components.

Referring to FIG. 4, the environment of the preferred embodiment is depicted. Illustrated are a local computer node 222 and a remote computer node 204. The local node 222 contains at least a client domain 220, a naming service 224, a virtual memory manager ("VMM") 230 and a caching file server ("CFS") 218. The remote node 204 is shown with a file server 206 and an attached disk unit 202 containing at least one file 200.

In the local node 222, the client domain 220 is shown containing a file object 211 which was created by the file server 206 for operations on file 200. The CFS 218 is shown containing a cachable_file object 229 used to forward methods invoked on the file object 211 to the file server 206. The CFS 218 contains caches 270 for attributes and bind results, and a file_cacher object 241/fs_cache object 251 connection 244 for keeping the caches 270 coherent. Also shown is the direct pager object 234 to fs_cache object 251 connection 253 whereby the VMM 230 in the local node 222 maintains its file data cache for page-in/page-out operations on the file 200.

The CFS permits end user client programs on a local node of a distributed computer system, to issue requests to read/write data to a remote file and to query/set attributes of the remote file, and to have these requests serviced by the CFS in a way which minimizes the caching resources used as well as minimizes the related network communications. The CFS establishes CFS file objects to interface with the client programs, and sets up a common CFS cache for the file attributes, which cache is kept current via a communications link to a file program in a file server at the remote node containing the file, wherein the file program in the File Server at the remote node and the file attributes in the common CFS cache are maintained coherent. In addition the CFS coordinates all client program requests for read/write data with a virtual memory manager ("VMM") on the local node, servicing all client programs from a single data cache in the VMM, if possible. A cache of the results of previous bind () operations is maintained by the CFS to facilitate this use of a single data cache for multiple clients. In this manner, network communications and related processing overhead as well as memory resources are minimized by use of the VMM for caching file data and the Common CFS cache for caching file attributes.

Figure 5:
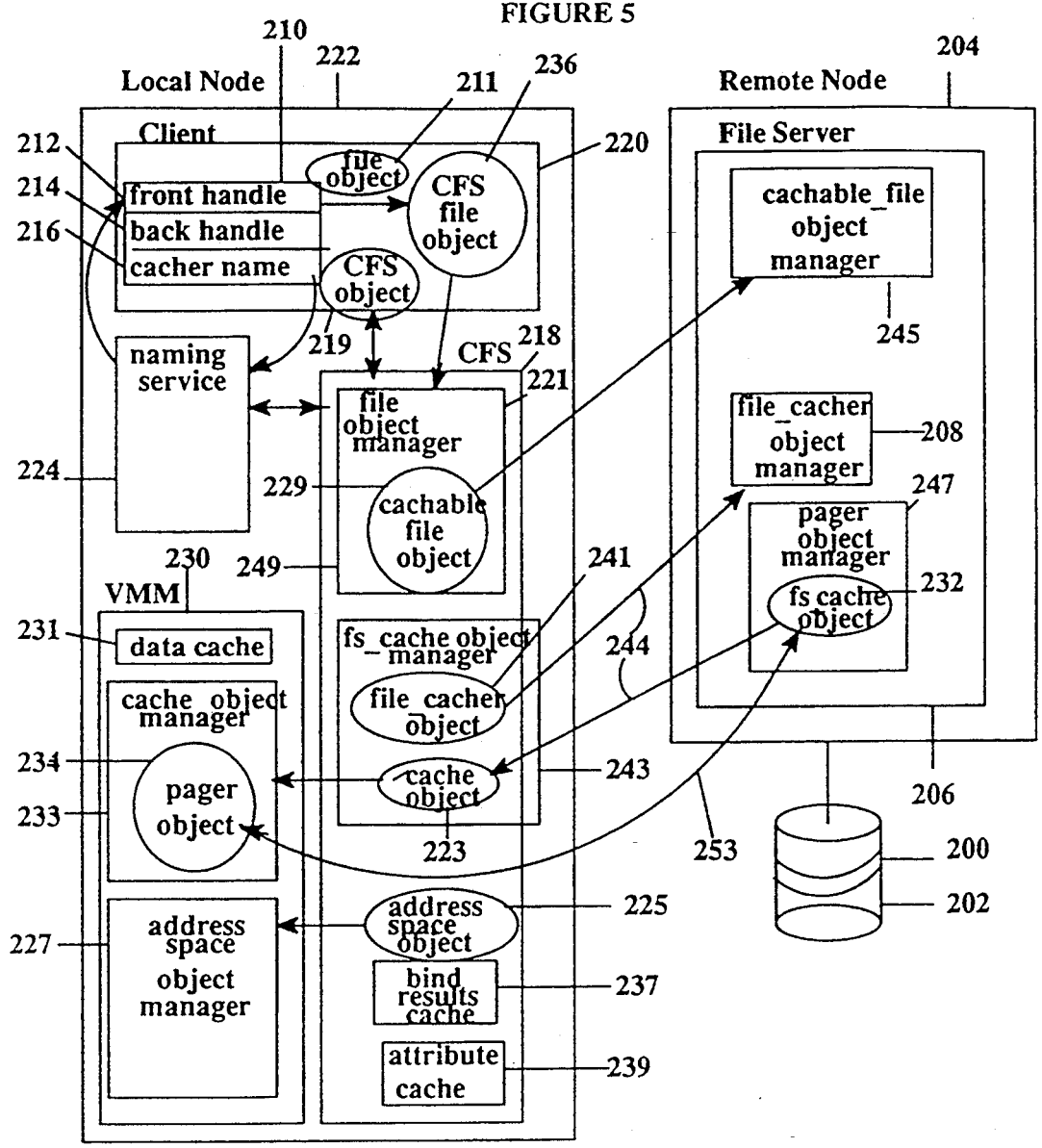
FIG. 5 illustrates the major components of the CFS and their relationship to other major components.

Referring to FIG. 5, the operation of the CFS is described. According to the preferred embodiment of the present invention, when a client program 220 running on machine 222 wishes to access a file 200, it proceeds as follows, 1) the client program 220 obtains a file object 211 which represents the file 200.

2) the file object 211, has associated with it, an extended cachable handle 210, which contains a back handle 214 which points to the file object manager 245 on the remote node 204, and a cacher name 216 for a cacher that knows how to cache data for this kind of file object 211;

3) the client program 220 calls upon the local name service 224 to look up the cacher name 216 portion of the extended cachable handle 210 and is given a CFS object 219 on the local machine 222 which points to the CFS 218 which can cache the data and attributes for the target file 200.

4) the client program 220 then requests that the local CFS 218 set up the necessary caching procedure for the file object 211, by calling the CFS object 219 and giving it a copy of file object 211 (which contains the extended cachable handle 210). The CFS object 219 returns a CFS file object 236 which will service requests for file data and attributes from the file 200. The CFS file object 236 is placed in the front handle 212 of the file object's extended cachable handle 210. (The details and operation of this extended cachable handle are described in more detail in co-pending application Ser. No. 07/858,788 filed by Graham Hamilton and Michael N. Nelson for A Method and Apparatus for Portable Object Handles that Use Local Caches, which is hereby incorporated herein by reference.)

5) when the client program 220 tries to read the file 200, using the file object 211, the CFS file object 236 in the front handle 212 calls the CFS file object manager 221 which invokes the map method on its address_space object 225. The address_space object 225 is implemented by the address_space object manager 227 in the local VMM 230. The VMM 230 invokes a bind () method on the file object 211. Since calls on file object 211 are directed to the CFS file object 236 by the front handle in the file object 211, the bind () call goes back to the CFS file object manager 221. The CFS file object manager 221 checks its cache of bind results 237 to see if a cache for this file is already in existence. If so, a pointer to the cache to use is returned to the VMM 230. If no cache is already available one of two actions is taken:

1) If the file_cacher-fs_cache_object connection 244 is already established, then the bind is forwarded to the file server 206 by invoking the cached_bind method on the file_cacher object 241. The file server returns a pager object 234. or 2) If the file_cacher-fs_cache_object connection 244 is not established, then the bind is forwarded to the file server 206 by invoking the cached_bind_init method on the cachable_file object 229 passing in a fs_cache_object 232 implemented by the CFS 218, that the file server 206 can use to tell the CFS 218 when the VM cache object 223 is no longer valid. The file server returns a file_cacher object 241 and a pager object 234. In either case the CFS 218 then uses the pager object 234 to create a cache object 223 at the VMM 230. A pointer to the cache to use is then returned to the VMM 230 by the CFS 218. (The exact details of how this mapping and bind operation is performed are described in the co-pending application Ser. No. 07/904,226 filed by Yousef A. Khalidi and Michael N. Nelson for A Method and Apparatus for a Secure Protocol for Virtual Memory Managers that use Memory Objects which is hereby incorporated herein by reference.)

This mapping operation establishes a) a cachable_file object 229 in the CFS file object manager 221. The cachable_file object 229 is implemented by the cachable file object manager 245 in the file server 206 for use in obtaining file attribute data. A cache 239 for storing this attribute data is also set up in the CFS domain 218;

b) a pager_object 234 to fs_cache_object 232 pipeline. This pipeline is set up between the pager object manager 247 in the file server 206 and the VMM 230 to automatically handle page in/page out of file data without going through the CFS; and c) a cache 237 of the bind results (cache_objects) which are already established is set up for use in determining if the CFS needs to set up a new fs_cache object/pager object connection.

6) the client program 220 may then invoke read/write requests or query/set attribute requests on the file object 211. These requests go via the front handle 212 which points to the CFS file object 236 which services the read/write requests via the data cache 231 in the VMM 230. However the query/set attribute requests are serviced by the CFS file object manager 221 from its own cache of these attributes 239. If the CFS file object manager 221 has cached the result of the query/set attribute operation then the request can be accommodated locally with no network accesses required. Otherwise the CFS file object manager 221 must contact the remote file server 206 to get the attributes. This requires that the CFS takes one of two actions:

1) If the file_cacher-fs_cache_object connection 244 is already established, then the get_attributes is forwarded to the file server 206 by invoking the cached_stat method on the file_cacher object 241. The file server returns the attributes. or 2) If the file_cacher—fs_cache_object connection 244 is not established, then the get_attributes is forwarded to the file server 206 by invoking the cached_stat_init method on the cachable_file object 229 passing in a fs_cache_object 232 implemented by the CFS 218 that the file server 206 can use to tell the CFS 218 when any file attributes have changed since the last transmission to the CFS 218. The file server returns a file_cacher object 241 and the attributes. In the preferred embodiment, when the client 220 issues a "get attributes" request, this also is directed to the CFS 218 which uses the file_cacher_object 241 to forward the request, and the parameter list of the "get attribute" request contains a "call back" object (another fs_cache object 232) which the remote file server 206 can use to tell the CFS 218 when any file attributes have changed since the last transmission to the CFS 218.

In the present invention, the CFS can service several client programs which request information from the same file without creating duplicate caches or using redundant network overhead. For example, two client programs wishing to access the same remote file can either use the same CFS file object or they can use different CFS file objects. If two client programs independently ask the CFS to cache a remote file, then the two client programs will have different CFS file objects implemented by the CFS. However, if one client program sets up the cached file with the CFS and then passes the CFS file object to another client, the two client programs will use the same CFS file object. In either case, the two client programs will share the same remote file object because the CFS will make sure the clients' CFS file objects point to the same underlying cached state.

Figure 6:
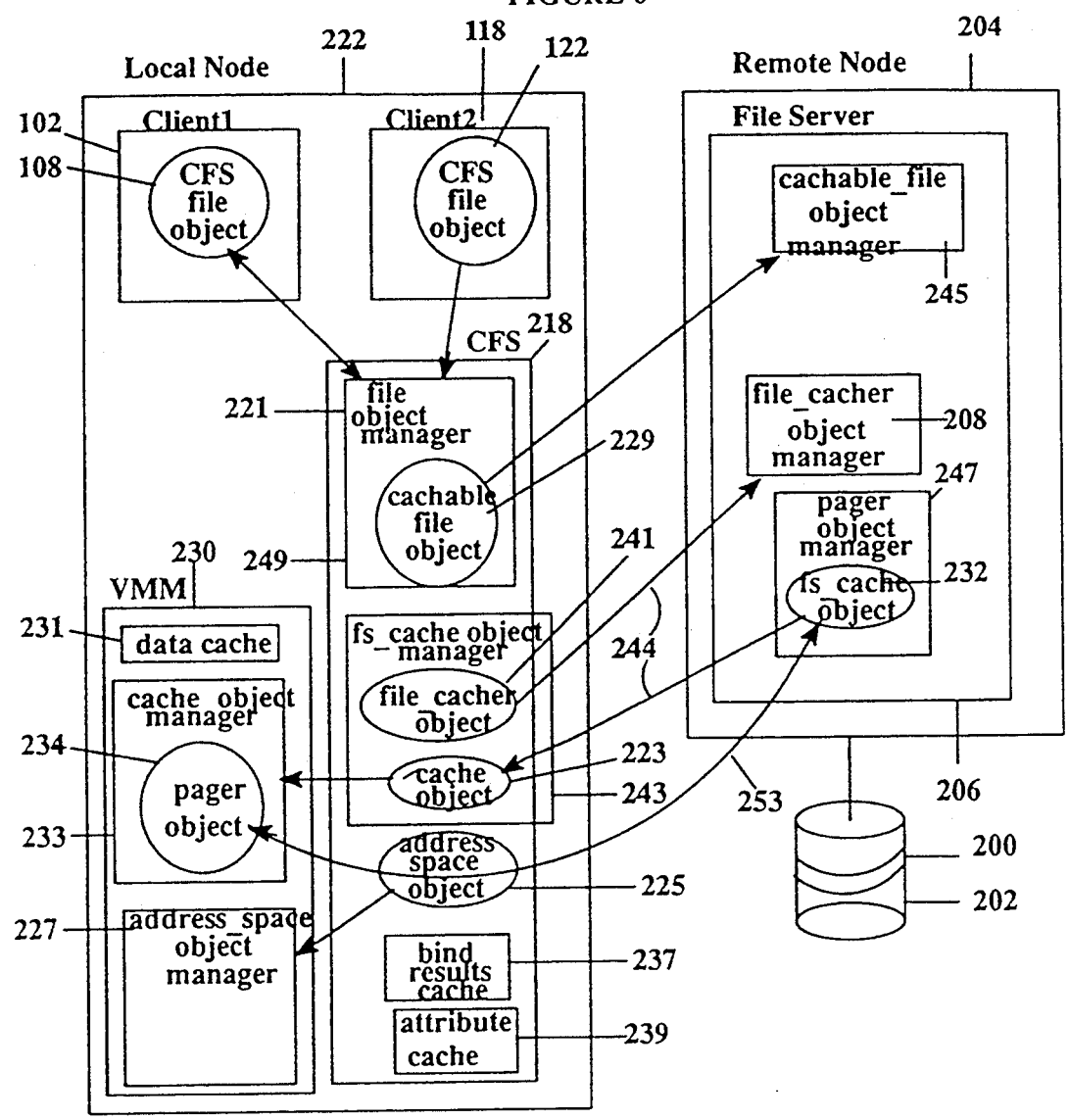
FIG. 6 illustrates the relationship of multiple client domains to the CFS environment.

This servicing of multiple client programs is now illustrated by means of FIG. 6. A first client program 102 asks the CFS 218 to cache remote file 200. The CFS 218 provides a first CFS file object 108 for the first client 102 to use in processing requests on the file. The CFS 218 establishes a communications link 244 to the file server 206 located on the remote node 204 to obtain the file attributes which the CFS 218 caches in the CFS attribute cache 239. The CFS 218 also establishes the communications between the CFS file object manager 221 and the VMM 230 which caches the file data in the data cache 231 by means of the pager_object 234/fs_cache_object 232 pipeline. This pipeline results from the map and bind operations previously described. Pager object 234 is connected to fs_cache object 232 in the pager object manager 247, and also connected via the link between the fs_cache object 232 and the cache object 223 in the fs_cache object manager 243 in the CFS 218.

When a second client program 118 asks the CFS 218 to cache the same remote file 200, the CFS 218 implements a second CFS file object 122. However, since the CFS 218 has already set up a CFS attribute cache 239 to handle file attributes for the remote file 200, the second CFS file object 122 is merely directed to the existing CFS attribute cache 239. Similarly, when the second CFS file object 122 wishes to read or write data to the file 200, the file object manager 221 again invokes an operation to map the file in the CFS address_space using its address_space object 225. Once again this causes the VMM's address_space object manager 227 to invoke a bind () operation on the file object 122 which is again directed to the CFS 218. This time the CFS 218 checks its cache of bind results 237 to see if that file 200 is already being cached by the VMM 230. When the CFS 218 finds that it is already being cached, the CFS 218 returns a pointer to the fs_cache_object/pager_object pair being used, and the bind operation is completed. Thus, duplicate caches are not established and the redundant network communications overhead is avoided by the process.

In an alternate embodiment, if the first client program 102 had set up the first CFS file object 108 with the CFS 218, the first client program 102 may pass the first CFS file object 108 to the second client program 118. In that case, both client programs 102 & 118 would use the same CFS file object 108, and as before both client programs would be serviced by the CFS 218 with only one set of caches.

While the preferred embodiment has been described in terms of object oriented programs and within an object oriented operating system, those skilled in these arts will recognize that the present method and apparatus may equally be implemented as non-object oriented programs and can be practiced in other and different operating systems within the spirit and scope of the appended claims. In addition, it will be clear to one skilled in the art that the invention as described above may be practiced in any number of particular implementations. The following sections describe additional incidental details of the presently preferred embodiment but are not deemed necessary to other modes of practicing the invention.

DETAILS OF THE PREFERRED EMBODIMENT

The SPRING File Interface

SPRING files contain data and attributes and support authentication and file locking. The file object interface provides access to the file's data through two mechanisms. One way is through read and write methods; these methods are inherited from the SPRING io interface. The other way is by mapping the file object into an address space; this ability comes by making a file object inherit from the memory_object interface. The file object interface also provides a write_back method to force the data safely to disk.

SPRING files have three attributes: the length of the file, its access time, and its modify time. The file interface provides get_length and set_length methods to access the file length; these methods are inherited from the memory_object interface. All three of the attributes can be retrieved via the stat method; there are no methods to directly modify the access or modify time.

SPRING files support SPRING authentication by inheriting from the authenticated interface. The authenticated interface also contains access, and acl interfaces. The acl interface provides access to the file's access list. The access interface provides access to a file's encapsulated rights and principal owner. The authenticated interface allows new file objects to be created that reference the same underlying file data and attributes as the current file, yet contain different encapsulated rights.

SPRING files also support file locking. Files support single writer multiple reader semantics. The read_lock method will succeed if the file is not write locked. Once a read lock is granted all writes will fail. The write_lock method will succeed if the file is open for writing and no one has either a read or a write lock on the file. Once a write lock is granted, all reads and writes by other equivalent file objects will fail. The unlock method will release any lock previously granted by the read_lock and write_lock methods.

The SPRING file interface does not have a close method. When file objects are no longer needed, then, just like any other SPRING object, they are consumed. This will cause the file system to be called with an unreferenced call on the file object when the last reference to the file object goes away.

In summary, SPRING file objects inherit from the io, memory_object, and authenticated interfaces. In addition the files support methods for locking, getting attributes, and forcing a file's data to disk. In the present invention, the CFS implements file objects and the file objects use the singleton subcontract. (Subcontracts are described below). The following depicts the interface definition for a SPRING file object:

```
interface file: io::io, pager::memory_object, authenticated::authenticated {
//
//Write back to disk all bytes between offset and offset + size − 1.
//If size == −1 then size will be set to the actual size of the
//file. For example to write back an entire file just do
//write_back(0, −1).
//
void write_back(copy long offset, copy long size)
raises (exceptions::trouble);
//
//Return the stats for the file.
//
stat_buf stat()
raises (exceptions::trouble);
//
//Get a write lock on the file. This will fail if the file
//is already locked by anyone else. Once the lock is granted
//then all future attempts to lock this file object will
//fail until it is unlocked.
//
void write_lock()
raises (access::denied);
//
//Get a read lock on the file. This will fail if the file
//is already locked for writing by anyone else. Once this lock
//is granted then all future attempts to attain lock this file
//for writing will fail until it is unlocked.
//
void read_lock()
raises (access::denied);
//
//Unlock the file.
//
void unlock();
};
```

In addition to the file object, SPRING and the preferred embodiment of the present invention, makes use of cachable_file objects. The cachable_file object inherits from the file object and from the cachable object interfaces. Cachable_file objects are implemented by the remote file-server and use the caching subcontract. The interface definition of the cachable_file object is as follows:

```
//
//Flags given as a result of caching operations.
//
typedef long cache_flags;
const long can_cache_length = 0 × 1; //Can cache the length.
const long length_exclusive = 0 × 2; //Have exclusive access to the length
const long can_cache_time = 0 × 4; //Can cache the access and modify times
//
//Flags passed to cached_stat_init and cached_stat.
//
typedef long stat_flags;
const long get_excl_length 0 × 1;
const long need_accurate_time = 0 × 2;
//Flags returned from get cache stuff.
//
typedef long file_flags;
const long temp_file = 0 × 1;
interface cachable_file: file::file, cacher::cachable {
//
//cached_bind_init is an extended version of memory_object::bind.
//      Input Parameters:
//      my_name: Name of the CFS.
//      cache_obj: fs_cache_object to use for VM and CFS cache
//      flush_backs.
//      request_access: desired access of bind.
//      want_cache_pager: TRUE => need a pager object that the
//      VMM can use to page data in and out.
//      Output Parameters:
//      ownership: whether VMM gets exclusive or shared access.
//      stats: file attributes.
//      cache_status: cachable status of file attributes.
//      Or of cache_flags values given above.
//      file_cacher_obj: object to use for future cached operations
//      cache_pager_obj: pager object for VMM to use to
//      in and out. Is NULL if!want_cache_pager.
//
void cached_bind_init(
copy name::name my_name,
consume fs_cache_object::fs_cache_object cache_obj,
copy long request_access,
produce vcache::ownership_t ownership,
produce file::stat_buf stats,
produce long cache_status,
produce file_cacher::file_cacher file_cacher_obj,
copy boolean want_cache_pager,
produce pager::pager_object cache_pager_obj
)
raises (access::denied, exceptions::trouble);
//
//Return the stats for a file and set up the caching connection.
//      Input Parameters:
//      my_name: Name of the CFS.
//      cache_obj: fs_cache_object to use for VM and CFS cache
//      flush_backs.
//      flags: desired cache status of attributes. Or of stat_flags
//      given above.
//      Output Parameters:
//      stats: file attributes.
//      cache_status: cachable status of file attributes.
//      Or of cache_flags values given above.
//      file_cacher_obj: object to use for future cached operations.
void cached_stat_init(
copy name::name my_name,
consume fs_cache_object::fs_cache_object cache obj,
copy long flags,
produce file::stat_buf stats,
produce long cache_status,
produce file_cacher::file_cacher file_cacher_obj
)
raises (access::denied, exceptions::trouble);
```

```
//
//get cache stuff returns the things that are needed by
//someone who is caching this file.
//
void get_cache_stuff
    produce long id,
    produce long rights,
    produce long flags,
    produce comparator comp
    );
};
```

While these interface definitions describe the presently preferred embodiment of the file and cachable_file objects as used in the present invention, those skilled in the art will recognize that alternative definitions can be used in the present invention.

The Caching Subcontract

When client domains receive objects from a remote file server, the initial processing steps are performed through use of the caching subcontract mechanism. These steps include finding whether a local caching server (the CFS of the present invention) is present, identifying it and easily interposing the CFS on the received file objects so that caching can occur. The following is a brief description of the use of subcontracts in the preferred embodiment of the present invention. Subcontracts are more fully described in co-pending application Ser. No. 07/995,863 filed by Graham Hamilton, Michael L. Powell, James G. Mitchell and Jonathan J. Gibbons for A Method and Apparatus for Subcontracts in Distributed Processing Systems, filed on the same date as this present application and which is incorporated herein by reference. Moreover, while these details are provided for completeness, those skilled in the art will understand that they are not essential to the practice of the CFS invention.

Every SPRING object has a subcontract associated with it. Subcontract is responsible for many things including marshaling, unmarshaling, and invoking on the object. Subcontract also defines the representation for each object that appears in a client domain's address space. The standard SPRING subcontract is called singleton. The representation of a singleton object includes a nucleus door (or handle) that identifies the server domain. When a client invokes on an object that uses singleton, this handle is used to send the invocation to the server domain.

File objects acquired from a remote fileserver are actually cachable_file objects and use a different subcontract called the caching subcontract. The representation for an object that uses the caching subcontract contains several things, including an extended cachable handle that identifies the server domain that can cache the type of object which contains this handle, identifies the file server that created the file object (called the back handle), and identifies an object (called the cached_object) that is implemented by a domain that caches the original object (located in the front handle). This cached_object will be null if there is no cacher or the file server is not remote. Whenever an invocation occurs on an object that uses the caching subcontract, the invocation is done on the front handle (the cached_object) instead of the back handle (the file server's handle) unless the cached_object is null.

The cached_object is obtained when the cachable_file object is unmarshaled. This is done by the subcontract unmarshalling code, using the other two parts of the caching subcontract representation which include a name of the cacher to use and a flag saying whether to try to cache the object. When a cachable_file object is unmarshaled into a client domain, if the try-to-cache flag is true, the unmarshaling code resolves the cacher name to see if there is a cacher object present. If there is, it invokes the get_cached_obj method on the cacher object (this is the CFS object 219 in FIG. 5), passing it in a copy of the file object; the representation of the copied file object is identical to the original except the try_to_cache flag is false. When the cacher domain receives the copy of the file object, it creates a new object that it implements (called the CFS file object 236 in FIG. 5) and returns this to the client domain. The object returned from the cacher is stored as the cached_object in the front handle of the original file object's extended cachable handle. In addition, the subcontract of the object which is returned and stored as the cached_object is set to the singleton type subcontract to avoid any endless loop when the cached_object is next invoked on the CFS. The CFS uses the copy of the cachable_file object (229 in FIG. 5) which is the same as the original file object but with the front handle of the extended cachable handle of the cachable_file object set to null so that invocations of methods on it will go directly to the file server (pointed to in the back handle). The cachable_file object 229 is implemented by the cachable_file object manager 245 in the remote file server.

When an object that uses the caching subcontract is marshaled, both the handle and the cached_object are marshaled. This is necessary to allow cachable objects to be efficiently passed between domains on the same machine. As a result, when a cacher object is invoked with an object to cache it is possible that the cached_object is implemented by the cacher (that is, the CFS). The caching subcontract allows cachers to get at the cached_object in the representation. Thus when a cacher receives an object to cache, it extracts the cached_object and sees if it implements it. If it does, then it just returns the current cached_object as the result from the get_cached_obj call.

The CFS Cacher Object

The CFS implements a cacher object (referred to above as the CFS object 219 in FIG. 5), which it exports in a public place (in the name server) under a known name. Whenever the storage fileserver creates a file object, it sets the cacher name in the file object's extended cachable handle representation to be the name of the CFS. Thus when a file object is unmarshaled, the CFS's cacher object will be found and the get_cached_obj method will be invoked on the cacher object. The CFS will then return a file object (identified above as the CFS file object 236 in FIG. 5) that it implements.

When the CFS receives a get_cached_obj call it must determine two things. First, it has to determine if it implements the cached_object; if so it just returns it. Second, it has to determine if it already caches the given file object. If so it needs to make sure that the file object that it returns uses the already existing cache state. In order to determine if it already caches a file object, the CFS must see if the file object is equivalent to file objects that it already caches. This is done by using the file object that was passed in to the get_cached_obj call.

The type of the file objects that are implemented by the storage fileservers are actually a subclass of file called cachable_file objects. Thus whenever the CFS is passed a file to cache from the get_cached_obj call, the type of this object is actually cachable_file. A cachable_file has additional methods that are used by the CFS to enable it to cache files.

One of the cachable_file methods is get_cache_stuff. The CFS invokes this method on the file objects that are received from the get_cached_obj call. This method returns a comparator object, a hash value, the encapsulated rights, and whether the file is a temporary file or not. The comparator object and the hash value are used to determine equivalence, the use of the rights will be explained below, and the temporary file flag is used in determining the writing policy.

The CFS maintains a hash table of cachable_file objects that it caches. The key into this table is the hash value returned by the get_cache_stuff call and the comparator object; the value is a pointer to internal cache state. Two cachable file objects are equivalent if the hash values are the same and both comparators agree that the two objects are equivalent.

Once the CFS determines if it caches the file already, it can construct a CFS file object that it implements and return it to the client. If it doesn't cache the file, then it will create internal caching data structures and put an entry into the hash table. The CFS file object that it returns will have as part of its server side representation the rights returned from the get_cache_stuff call and the cachable_file object.

Comparators

The CFS uses cachable_file comparators to determine if two cachable_file objects are equivalent. The object equivalence algorithm employed by the CFS is different than the standard one that is used by other parts of Spring.

Instead of retaining a cachable file object in its cache, the CFS retains a cachable_file_comparator object that is implemented by the storage fileserver and is associated with the original cachable file object. The server side state of this comparator object contains enough information such that it can determine if other cachable_file objects are equivalent to the one to which the comparator corresponds. Thus in future comparisons, the comparator can be used instead of the cachable_file.

When the CFS receives a file F to cache it invokes the get_cache_stuff method to get the comparator. Once this comparator is obtained it is used to compare its file object to other objects in the cache. If there are no other objects to compare to, this comparator is stored in a CFS cache. However, because this comparator is going to be used for future comparisons in place of F, this comparator must be verified for security reasons.

In order to verify the authenticity of the comparator returned from the get_cache_stuff call, the CFS invokes the equivalent method on the comparator and passes in the file to be cached. If the comparator agrees that the file is equivalent to the cachable_file that it is associated with, then the CFS knows that this is a good comparator and the CFS can safely enter it into the CFS's cache.

If there are other objects in the cache when the CFS receives a file F1 to cache, then the CFS needs to do the comparisons. After obtaining the comparator C1 for file F1 the following steps are used to determine if F1 is equivalent to some existing F2 with comparator C2:

1. The equivalent method is invoked on C2 passing it F1.
2. If C2 claims F1 is equivalent to the object that C2 represents, then the equivalent2 method is invoked on C1 passing in C2 and F1.

Both C2 and F1 are passed to C1 to make sure that C1 agrees that the object that it represents is equivalent to the object that C2 represents and that C1 agrees that it is in fact the comparator for F2.

While this description of Object Equivalence is not considered essential to the present invention, nevertheless the presently preferred embodiment of the invention incorporates these facilities. The basic SPRING object equivalence procedure is described in more detail in co-pending application Ser. No. 07/787,320 filed by Graham Hamilton, Michael L. Powell and John Chapin for Secure Object Equivalency Determination, which is hereby incorporated herein by reference.

Security

The CFS file server is trusted by client domains to cache their files. The CFS needs to ensure that it doesn't accidently allow some client to attain greater access to some cached file than they are allowed.

The first step towards ensuring security is the object equivalence algorithm given in the previous section. Using this algorithm the CFS can be confident that files are truly equivalent and it isn't being fooled.

The other security step taken by the CFS is to fetch the rights from the cachable_file that it is presented with and encapsulate these in the file object that it implements. It checks these rights on every operation on the file object implemented by the CFS to ensure that the client is allowed the desired access.

Fileserver to Fileserver Interface

In the preferred embodiment an additional connection between the CFS and the related remote file server is established. The cachable_file object provides part but not all of the CFS to remote fileserver connection needed for caching. The cachable_file interface provides methods to determine file equivalence and to set up the rest of the caching connection. The cachable_file object by itself isn't sufficient for two reasons:

The remote file server needs to know which CFS a caching request is coming from. Since a given cachable_file object can be possessed by many different CFS domains, there is not an easy way for a remote file server to determine where a caching request is coming from.

The remote file server needs to be able to perform call-backs to the CFS to perform coherency actions.

Thus there is an additional interface between the CFS and the storage fileservers similar to the fs_cache object also acts as a call back object, used by the file server to keep coherent, the attribute and data cached in the CFS. The storage fileservers implement an object of type file_cacher (241 in FIG. 5). Since the fs_cache object is a sub-class of a cache object, both of these objects support methods for attribute and data cache coherency. A two way connection (244 in FIG. 4) between the CFS and file server using the fs_cache object and the file_cacher object, is initialized when the CFS invokes the first operation that requires it to cache information from a remote fileserver.

The fs_cache object used by the CFS and the storage fileservers is sub-class of the VM cache object to make the implementation of the storage fileservers easier. The storage fileservers have to deal directly with VM systems and with caching file servers. By making the file system cache object a subclass of the VM cache object, the coherency code in the storage fileservers may be ignorant of whether it was dealing with a VM system or a CFS.

The interface of the fs_cache object and the file_cacher object are as follows:

```
interface file_cacher:{
//
//Do a bind for the associated cachable_file object. This is just
//like cached_bind_init on the cachable_file object except the
//file_cacher_fs_cache_object connection is already set up.
//
void cached_bind(
copy long request_access,
produce vcache::ownership_t ownership,
produce file::stat_buf stats.
produce long cache_status,
copy boolean want_cache_pager,
produce pager::pager_object cache_pager_obj
)
raises (access::denied, exceptions::trouble);
//
//Get back cached attributes. This is just like cached_stat_init on
//the cachable_file object except the file_cacher_fs_cache_object
//connection is already set up.
//
void cached_stat(
   copy long flags,
   produce file::stat_buf stats,
   produce long cache_status
)
raises (access::denied, exceptions::trouble)
//
//Set the length of the associated cachable_file object.
//
void set_length(copy long length);
//
//Release the cached info for this file_cacher object. If any
//of the length, acc_time, or mod_time are ! = −1, then these are
//the cached versions of these attributes.
//
void release_cache_info(
  copy long length,
  copy long acc_time,
  copy long mod_time
  );
};
};
Here is the interface for fs_cache_object:
interface fs_cache_object: vcache_object::vcache_object {
//
//get_acc_mod_time -
//
//Return the time of the last access and last modification. A time
//of −1 means that the file hasn't been accessed or modified since
//we were last asked. In this case the possessor of this object
//won't ask again until we do another bind of the object.
//
void get_acc_mod_time(produce long acc_time, produce long mod_time);
//
//get_length-
//Return the length. If delete_it then the length can no longer
//     be cached. Otherwise the length can be cached read-
only
//
long get_lenght (copy boolean delete_it):
//
//dont_cache_time - -
//Dont cache the time anymore.
//
void dont_cache_time();
//
//delete_cache - -
//
//The cached VMM cache_object is no longer valid.
```

```
//
void delete_cache(produce long acc_time, produce long mod_time);
};
    };
```

Caching Binds

One of the important jobs of the CFS is to cache the results of binds since they occur on every map call. When the bind method is invoked on one of the CFS's file objects by the VMM, the CFS will first check to see if the client has the desired rights. If so the CFS then checks to see if it already has a VM cache object with the desired rights cached for the file object. If it does then the CFS can merely return the cache object to the VMM thereby eliminating a network access.

When the CFS finds that it doesn't have an appropriate cache object to return to the VMM, it must get one. In order to do this, it must talk to the remote fileserver to get a pager object that the VMM can use since it is desired that all page-ins and page-outs go directly to the file server. Having these transmissions go through the CFS would provide no added value.

The CFS talks to the file server using one of two methods. If it already has set up the fs_cache_object/file_cacher connection with the remote file server, it will invoke the bind method on the file_cacher object (241 in FIG. 5). Otherwise it will invoke the bind_init method on the cachable_file object 229, passing it an fs_cache_object that the CFS implements. Both of these methods will perform an access check and then return a pager object. These methods also return the attributes for the file such as length and modify time, and flags indicating whether these attributes can be cached; this is done so that subsequent remote calls to get attribute can be avoided.

Once the CFS has contacted the remote fileserver and obtained a pager object, it calls the local VMM with the pager object to create a VM cache-object. Once it has this cache object, the CFS keeps a copy of the cache object which it stores in its cache of bind results, and then returns the cache object to the caller of bind (the VMM by way of the file object 211).

The configuration that results after a successful cached bind operation is shown in FIG. 6. Note that the VMM 230 has a direct pager connection 253 to the remote fileserver 206 and the remote fileserver's cache object 232 is actually implemented by the CFS 243. Thus all cache coherency operations on the cache object 232 will indirect through the CFS 218. This does not slow things down much since it is just one extra local call being added to two remote calls (the coherency call and the page operation) and all of the data is being transferred using the direct pager object connection 253. The advantage is that the CFS can interpose if it wishes and the remote file server only has to have one cache object instead of two.

Caching Read and Write

The CFS caches data for reads and writes by mapping the file that is being read or written into its own address space. Once the file is mapped, then the data can be copied into or out of the mapped region as appropriate. Since file mapping is used, all of the issues of data caching are handled by the virtual memory system and the remote file servers.

When the file being read or written is mapped by the CFS, the file object implemented by the CFS is used rather than the cachable file object implemented by the remote fileserver. This is to take advantage of the bind caching that was described in the last section. This is important because the CFS only maps in a fixed size region of the file so that the entire address space of the CFS doesn't get occupied by a couple of big files. If a file is larger then this region, then it will take multiple map operations, and hence multiple bind operations, to access the entire file.

In order to implement read and write, the file length must be available locally. In particular, for writes that append data to a file, the CFS must have the ability to modify the length locally. Therefore the ability to cache the file length is essential to providing good read and write performance.

Keeping Files Coherent

Because a given file can be mapped into client's address spaces on several machines at the same time, there is a potential coherency problem. For example, if two clients on different machines have the same page of a file mapped into their address space both readable and writable, then one client will not see the other client's changes to the page. Thus the two clients will not see a coherent view of the file. One of the primary jobs of the SPRING file system is to keep files coherent.

Although providing coherent files adds complexity to the file system, it is a necessity in a network transparent system. By keeping shared files coherent, distributed shared memory is provided. Thus clients can communicate transparently via shared files; they don't have to know whether other domains that they are communicating with are local or remote. This network transparency can be exploited to dramatically improve performance by distributing applications such as make across multiple machines.

Because files can be accessed a page at a time, coherency is done on a per page level. The SPRING file system ensures that if a page is writable, then the page will only be in a single cache. If a page is only being read, then copies of the page may be present in any number of caches. The file system can guarantee this because it gets all page-in requests.

Each request indicates whether the page is desired in read-only or read-write mode.

Any page-in request can cause a page to go from read-only to writable or from writable to read-only. When this transition happens the file server must take action to ensure that coherency is maintained before returning a page to the requesting client. It does this by invoking methods on the cache objects that are associated with each file object. If a page transitions from read-only to writable, then the file server invokes the flush_back method on all cache objects that currently possess the page; if the client that requests the page writable already has the page readable, then the page is not flushed from the requesting clients cache. If a page transitions from writable to read-only, then the file system invokes the deny-writes method on the cache object that possesses the page; deny-writes will force a cache to write the page back if it is dirty and then make the page read-only.

Getting and Setting File Length

Another operation on files is getting and setting the file length. Getting the file length involves invoking the get_length method on the file object; since there are no side-effects of the get_length method, it has no impact on file data coherency.

Setting the length involves invoking the set_length method on a memory object. There are two interesting cases with set_length: the length is made shorter and the length is made longer.

If the length is made shorter, the pages at the end of the file need to be eliminated from the file and from all caches of the file. If the pages aren't removed from the caches, then clients won't see a consistent view of the file because some clients may be able to access parts of the file that no longer exist. Pages are deleted from caches by invoking the delete-range method with the appropriate data range on all cache objects that possess deleted pages. If a file's length is increased, then nothing has to be done in order to insure coherency.

File length is cached by the CFS because:
It allows get_length and set_length operations to happen locally.
It allows read and write operations to happen locally.

In order to let set_length and write operations happen locally, client's must have the ability to modify the length locally. As a result a length coherency algorithm is necessary. The storage fileservers allow multiple read-only cached copies of the size, but only one read-write copy. If a CFS requests a copy of the length and it is being cached read-write, then the remote fileserver retrieves the length from the caching client before giving a copy of the length to the requesting client. If a CFS requests permission to modify the size of a file, the remote fileserver invalidates the length from all caches after retrieving any cached read-write copy.

The file length also has to be retrieved by the storage fileservers on page faults. Whenever a fault happens on a file object, the fileserver must know the current size of the file to determine if the page fault is legal. Thus, if on a page fault the length is being cached read-write, the fileserver will fetch the length back from the CFS and revoke write permission.

The storage fileservers keep the length coherent by using the fs_cache object that is provided by the CFS. This object has operations to get the cached length and to invalidate the length.

Having the length cached writable only allows a CFS to increase the length without informing the storage fileserver. A CFS still has to call through to the file server when a file is truncated for two reasons. First, the file server needs to take coherency action and flush the truncated data from all other caches; this reason isn't valid if the file is only cached by the CFS that is doing the truncate. Second, the file server will get confused if it isn't told about truncations. If a page fault occurs on the file after a truncation of the file, the remote fileserver won't know whether the data on disk is valid or not since it doesn't know if the file has been truncated.

The length is retrieved by a CFS using one of two methods. If it already has set up the fs_cache_object-/file_cacher connection with the remote file server, it will invoke the cached_stat method on the file_cacher object. Otherwise, it will invoke the cached_stat_init method on the cachable_file object passing it an fs_cache_object that the CFS implements. Both of these methods will return all of the file's attributes including an indication of whether the length and the time can be cached writable; this is done so that subsequent remote calls to get attributes can be avoided.

Zero-filling Cache Objects

When a file is lengthened, all of the new pages between the old length and the new length will be read as zeros the first time that they are read. Instead of the remote fileserver zero-filling these pages on page faults, it would be much more efficient if the virtual memory system could zero-fill these pages itself thus avoiding a cross-machine call and a data transfer. This optimization is implemented by the CFS. If the CFS has the length cached exclusively and the length is increased, the CFS invokes the zero_fill method on the VM cache object. If the file object hasn't been bound yet, then the CFS will do the zero-fill after the object gets bound.

The storage fileservers have to keep track of pages that are being zero-filled by VMMs. Whenever the storage fileservers discover that the length of the file has been extended by a CFS, they assume that all new pages between the old length and the new length are being zero_filled by the local VMM. The storage fileservers can discover that a CFS has lengthened a file in three ways:
  The length is retrieved for coherency purposes.
  The CFS gives the length back because it no longer is caching it.
  A pageout past the end-of-file occurs from a machine that has the length cached read-write. In this case the length is set to contain the last byte of the paged-out page.

In principle, this zero_filling optimization for file objects could be implemented by the storage fileservers as well; that is, they could call the zero$_{zero}$_fill method on the appropriate cache object. The only problem is that it may not know which cache object to do the zero filling on since a file object could be mapped by multiple VMM systems. In the normal case where a file object isn't being shared, then the storage fileservers will know which VMM to talk to. Having the storage fileservers implement the zero_fill operations is not done in the preferred embodiment because most clients get their files through the CFS.

Caching Time

Both the access time and the modify time are cached by a CFS. The modify time may be cached writable under certain conditions and a coherency algorithm is used for the modify time. The access time is not kept coherent in the presently preferred embodiment.

The modify time is kept coherent so that programs such as the UNIX program make can properly function. A CFS is allowed to cache the modify time for a file under two circumstances:
  No one has the file cached writable.
  The CFS is the only one that has the file cached writable.

In the second case, the CFS is allowed to change the modify time. The modify time is kept coherent using the dont_cache_time method on the fs_cache_object.

The time is retrieved by the cached_stat and cached_stat_init methods. When these methods are invoked, one of the return parameters is an indication of whether the modify time can be cached and if so if it can be cached writable.

Caching Other Attributes

The CFS caches all of the attributes that are retrieved via the stat call. When a bind or fetch the length or the time is executed, the other attributes are automatically returned as well. In the best case when attributes are not being modified on other nodes, the stat call can be handled with at most one network call to initialize the cache.

The one file attribute that isn't returned from the stat call is the access control list. This list is currently not cached by the CFS in the presently preferred embodiment.

Releasing Cached Attributes

When a CFS decides to discard its cached attributes, it needs to write any modified ones back to the storage fileserver. This is done by invoking the release_cache_info call on the file_cacher object.

Data and Length Write Back Policy

Modified data is cached by the VMM for files that are cached by the CFS. If the machine that the data is cached on crashes, this data will be lost. The storage fileservers employ a 30 second write back policy for writing back this cached data. In order to make the data even more secure the CFS employs its own write back policy: when the last reference to a cached file object is gone, the CFS will write back all modified data for the file. Data is not written back for temporary or anonymous files.

Writing back only the data is not sufficient, the size must be written back as well. The storage fileservers implicitly lengthen the file when pageouts past the end-of-file occur. Since pageouts are in page-size quantities, the file length is set to include the whole page. Thus the size has to be written back after the data is written back so the file server can know the true size of the file. When a storage fileserver gets the length from a CFS that is caching the size writable, it will truncate the file to that length.

The data and the length are actually written back by a set of write-back daemons. When the last reference to a cached file goes away, the CFS will append a write-back request to the queue if the file is writable. If the length is also writable, then the write-back request will indicate that the length should be written back as well after the data.

A Caching Swap Server

The CFS caches anonymous files. In the preferred embodiment the CFS implements its own VM swap pager. This swap pager implementation uses a special swap_pager interface with the storage fileservers. These fileservers actually implement a subclass of the VM swap_pager class called cachable_swap_pager. This class adds the additional method get_anon_files that allows the CFS and the storage fileservers to set up the fs_cache_object/file_cacher connection for each anonymous memory object. In addition the get_anon_files method returns the comparator and hash values for each object so that they can be entered into the hash table in the CFS.

The CFS only registers its swap pager object with the VMM if there is no local file server ("LFS"). If there is an LFS all swapping will happen to the LFS, so there is no need for the CFS to register its swap pager.

Using the Name Cacher

The implementation of caching that we have described so far requires three network accesses on each cache hit. This is a high overhead for programs that only do one or two operations per file. The UNIX program make is an example of a program that only does one operation per file: stat. Thus make would be better off without caching because it would be cheaper to do one remote operation instead of three. However, the programs that make invokes such as compilers do many more operations per file, but nevertheless it is desirable to eliminate this object equivalency overhead in the normal case. Fortunately by allowing name caching to help, all of the network accesses on name cache hits can be eliminated. To understand how the presently preferred embodiment of the CFS handles this problem it is necessary to define a "wrapped" object as a special kind of object which encapsulates another object so that it is not normally unmarshaled.

For security reasons, objects that are stored in name servers are not unmarshaled by the name server. To allow objects to be passed to a name server and not be unmarshaled the objects are enclosed in a wrapper object. The object inside the wrapper is not unmarshaled until the wrapper is returned to the client that did the resolve. In addition to an object, the wrapper also contains the object type id.

In order to allow cacher domains (such as the CFS) to avoid the object equivalence problem, the cacher object has a method in addition to the get_cached_obj method. The new method is get_named_cached_obj and is used in the following manner. When a name cacher gets an object to cache, it gets the object type id out of the wrapper and tries to find a cacher object stored under the object type id. If it finds one, it passes in the wrapped object to the get_named_cached_obj method. This method returns a new wrapped object that the name cacher will use to return from cache hits.

The CFS uses the get_named_cached_obj method to avoid the object equivalence calls. When the CFS receives a wrapped object in the get_named_cached_obj call, it unwraps the object to get the cachable_file object stored inside. It then does the same thing as the implementation of the get_cached_obj described above. However, instead of just returning a file object it does the following:

It marks the returned file object as inactive.
It puts the object into a wrapper.
It returns the wrapped object.

When the name cache returns an object to the client, the client will unmarshall the file object and invoke the get_cached_obj method on the cacher object implemented by the CFS. This time when the CFS gets the file object it will notice that it implements it and it is inactive. The CFS will then mark the object as active and return it to the client.

The notion of an object being active or inactive allows the CFS to know when the last active reference to a file is gone: file objects stored in the name cache are considered inactive and all other objects are considered active. The CFS needs to know when there are no more active references so that it can write back the file data and file length. If objects in the name cache were not considered as inactive, then name cached files would never be written back until the file was deleted from the name cache.

While the invention has been described in terms of a preferred embodiment in a specific operating system environment, those skilled in the art will recognize that the invention can be practiced, with modification, in other and different operating systems within the spirit and scope of the appended claims.

What is claimed is:

1. A computer system having a plurality of computers, each computer having a processor, a memory, and a microkernel operating system, said computer system comprising:
   a. an extensible file system wherein a new file system can be added to the system without modification to the microkernel operating system;
   b. a virtual memory manager (VMM) in a computer which can cache data from said new file system; and
   c. a caching file server (CFS) resident on the computer containing the VMM, said CFS configured to cache file system attributes from said new file system which attributes said VMM cannot cache, said CFS coordinating the caching operations for clients between said CFS and said VMM so that data caching is not duplicated by said CFS and said VMM.

2. The computer system of claim 1 wherein said CFS can also cache data related to bind operations which said VMM cannot cache.

3. A data processing system having one or more file systems and connected at a local computer to at least one remote computer by a communications link, and said local computer having a memory and a virtual memory manager ("VMM"), said data processing system comprising:
   a. at least one file in the one or more file systems;
   b. a microkernel operating system in said local computer thereby permitting a user to add a new file system without modification to the microkernel operating system;
   c. said VMM in said local computer comprising mechanisms for caching data from said at least one file system required by clients in said local computer, said mechanisms comprising memory in said local computer and devices for managing said caches and said memory and supplying said clients with data from said at least one file system; and
   d. a caching file server ("CFS") in said local computer outside of said microkernel operating system which provides caching services for the at least one file, said caching services comprising mechanisms for caching specific data within said CFS if said specific data is not cached by said VMM and mechanisms for using existing caches in said VMM for caching other data where said VMM is able to cache said other data thereby preventing any duplication of data caching in said CFS and said VMM, said CFS comprising a first file program in the CFS which recognizes requests from a first client program, to read first designated data which originates in the at least one file and which is passed to said first client through said cache in said VMM and to write second designated data which originates in said first client program and is ultimately written to said at least one file having passed through said cache in said VMM, said CFS coordinating the caching of said first and second designated data to the at least one file with the VMM in the local computer when said VMM can cache said first and second designated data, and wherein said CFS recognizes requests to query/set attributes of the at least one file and caches said file attributes in the CFS when said attributes are not cached by said VMM, said attributes of said at least one file comprising data which resides in said at least one file and which is accessible by said first client program, whereby the caching services provided by the CFS and the VMM for the first client program need not be duplicated and can minimize data transfer overhead by virtue of being cached at the local computer.

4. The data processing system as recited in claim 3 wherein said first file program in the CFS recognizes requests from a second client program, to read/write data to the at least one file and recognizes requests from the second client program to query/set attributes of the at least one file, and wherein said CFS coordinates the caching of read/write data to the at least one file with the VMM in the local computer to insure that only one cache of the read/write data is maintained for both of the first and second client programs when addressing a file, and wherein said CFS caches said file attributes in the CFS, whereby the caching services provided by the CFS and the VMM for said first and second client programs need not be duplicated and can minimize data transfer overhead by virtue of being cached at the local computer.

5. The data processing system as recited in claim 4 wherein the CFS services both the first client program and the second client program by use of a common CFS cache.

6. The data processing system as recited in claim 5 wherein bind requests are sent by a client program to the CFS, and wherein the CFS uses the common CFS cache to cache results of bind operations so that each new bind request is checked to determine if a binding already exists before transmitting the bind request to a remote computer.

7. The data processing system as recited in claim 6 wherein the CFS uses the common CFS cache to cache attributes of the at least one file.

8. The data processing system as recited in claim 7 further comprising a file program in a file server located on the at least one remote computer and a communications link between said file program and the CFS for supplying attribute data of the at least one file to the CFS.

9. The data processing system as recited in claim 8 wherein the file program in the file server located on the at least one remote computer supplies new attribute data from the at least one file to the common CFS cache to maintain coherent file attribute data, thereby permitting the CFS to control "set length" and "write" operations to said at least one file.

10. The data processing system as recited in claim 8 further comprising a cache program in the file server and a communications link between said cache program and a pager program in the VMM for supplying file data to and from the at least one file to the VMM, in response to page-in/page-out from the pager program in said VMM, whereby said VMM services requests from CFS programs for data from the at least one file.

11. The data processing system as recited in claim 10 wherein said programs are object oriented programs.

12. A data processing system having one or more file systems, one or more computers, each computer having a processor, a memory, program instructions in said memory, and a virtual memory manager ("VMM"), said data processing system comprising:

a. at least one file in the one or more file systems;

b. a microkernel operating system in a local one of said one or more computers, said microkernel operating system using an extensible file system wherein new file systems can be added by a user;

c. said VMM comprising mechanisms for caching data from said at least one file required by a client in a local computer, said mechanisms comprising memory in said local computer and devices for managing caches and said memory and supplying said client with data from said at least one file; and d. a caching file server ("CFS") in said local computer which provides caching services for the at least one file, said caching services comprising mechanisms for caching specific data within said CFS if said specific data is not cached by said VMM and mechanisms for using existing cache in said VMM for caching other data where said VMM is able to cache said other data thereby preventing any duplication of data caching in said CFS and said VMM, said CFS comprising a first file program in the CFS which recognizes requests from a first client program, to read first designated data which originates in the at least one file and which is passed to said first client through said cache in said VMM and to write second designated data which originates in said first client program and is ultimately written to said at least one file having passed through said cache in said VMM, said CFS coordinating the caching of said first and second designated data to the at least one file with the VMM when said VMM can cache said first and second designated data, and wherein said CFS recognizes requests to query/set attributes of the at least one file and caches said file attributes in the CFS when said attributes are not cached by said VMM, said attributes of said at least one file comprising data which resides in said at least one file and which is accessible by said first client program, whereby the caching services provided by the CFS and the VMM for the first client program need not be duplicated and disk input/output operations can be reduced.

13. The data processing system as recited in claim 12 wherein the file program in the CFS recognizes requests from a second client program to read/write data to the at least one file and coordinates the caching of read/write data to the at least one file with the VMM, and recognizes requests from the second client program to query/set attributes of the at least one file and caches said file attributes in the CFS, whereby the caching services provided by the CFS and the VMM for said first and second client programs need not be duplicated, and related disk input/output operations can be reduced.

14. The data processing system as recited in claim 13 wherein the CFS services both the first client program and the second client program by use of a common CFS cache.

15. The data processing system as recited in claim 14 wherein the CFS uses the common CFS cache to cache results of bind operations.

16. The data processing system as recited in claim 15 wherein the CFS uses the common CFS cache to cache attributes of the at least one file.

17. The data processing system as recited in claim 16 further comprising a file program in a file server containing the at least one file and a communications link between said file program and the common CFS cache for supplying attribute data of the at least one file to the CFS.

18. The data processing system as recited in claim 17 wherein the file program in the file server supplies new attribute data from the at least one file to the common CFS cache to maintain coherent file attribute data.

19. The data processing system as recited in claim 18 further comprising a cache program in the file server and a communications link between said cache program and a pager program in the VMM, for supplying file data to and from the at least one file, in response to page-in/page-out from the VMM, whereby said VMM services requests for data from the at least one file.

20. The data processing system as recited in claim 19 wherein said programs are object oriented programs.

21. A method, performed by a computer having a processor, a memory, a computer program residing in said memory, of accessing a remote file from a local computer in a data processing system having one or more file systems and connected at said local computer to at least one remote computer by a communications link, said method comprising:

a. using a microkernel operating system in said local computer;

b. using a virtual memory manager ("VMM") in said local computer outside of said microkernel operating system, comprising mechanisms for caching data from said one or more file systems required by a client in said local computer, said mechanisms comprising memory in said local computer and devices for managing said cache and said memory and supplying said client with data from said one or more file systems;

c. establishing a caching file server ("CFS") in said local computer which provides caching services for at least one file, said caching services comprising mechanisms for caching specific data within said CFS if said specific data is not cached by said VMM, and mechanisms for using existing caches in said VMM for caching other data where said VMM is able to cache said other data thereby preventing any duplication of data caching in said CFS and said VMM,; and d. establishing a file program in the CFS which recognizes requests from a first client program to read first designated data which originates in the at least one file and which is passed to said first client through said cache in said VMM and to write second designated data which originates in said first client program and is ultimately written to said at least one file having passed through said cache in said VMM, said CFS coordinating the caching of said first and second designated data to the at least one file with the VMM when said VMM can cache said first and second designated data, and wherein said CFS recognizes requests to query/set attributes of the at least one file and caches said file attributes in the CFS when said attributes are not cached by said VMM, said attributes of said at least one file comprising data which resides in said at least one file and which is accessible by said first client program, whereby the caching services provided by the CFS and the VMM for the first client program need not be duplicated and related network communications traffic between the local and remote computers can be minimized.

22. The method as recited in claim 21 further comprising the additional steps of recognizing requests from a second client program to read/write data to the at least one file and coordinating the caching of read/write data to the at least one file with the VMM in the local computer, and recognizing requests from the second client program to query/set attributes of the at least one file and caching said file attributes in the CFS, whereby the caching services provided by the CFS and the VMM for said first and second client programs need not be duplicated and related network communications traffic between the local and remote computers can be minimized.

23. The method as recited in claim 22 wherein the CFS services both the first client program and the second client program by use of a common CFS cache.

24. The method as recited in claim 23 wherein the CFS uses the common CFS cache to cache results of bind operations.

25. The method as recited in claim 24 wherein the CFS uses the common CFS cache to cache attributes of the at least one file.

26. The method as recited in claim 25 further comprising the steps of establishing a communications link between a file program in a file server and the common CFS cache for supplying attribute data of the at least one file to the common CFS cache.

27. The method as recited in claim 26 wherein the file program in the file server supplies new attribute data from the at least one file to the common CFS cache to maintain coherent file attribute data.

28. The method as recited in claim 27 further comprising a step of establishing a cache program in the file server and a communications link between the cache program and a pager program in the VMM, said VMM being located on the local computer, for supplying file data to and from the at least one file, in response to page-in/page-out operations from the pager program in said VMM, whereby said VMM services requests from CFS programs for data from the at least one file.

* * * * *